United States Patent [19]
Powers

[11] Patent Number: 5,729,854
[45] Date of Patent: Mar. 24, 1998

[54] MULTI-PURPOSE TOOL FOR BARBECUE GRILL

[76] Inventor: Richard J. Powers, 1015 S. Aldine Ave., Park Ridge, Ill. 60068

[21] Appl. No.: 698,305

[22] Filed: Aug. 15, 1996

[51] Int. Cl.⁶ .................................................. B25F 1/00
[52] U.S. Cl. ................... 7/109; 7/110; 7/167; 294/10; 294/24
[58] Field of Search .................. 7/109, 110, 167, 7/176; 254/21, 22; 294/10, 2, 27.1, 24; 15/236.08, 236.07

[56] References Cited

U.S. PATENT DOCUMENTS

| 790,228 | 5/1905 | Rohrer | 15/236.06 |
|---|---|---|---|
| 2,747,911 | 5/1956 | Kuever | 294/10 |
| 2,801,873 | 9/1957 | Faughnder | 294/27.1 |
| 2,824,323 | 2/1958 | Tos et al. | 15/236.07 |
| 4,112,537 | 9/1978 | Heuck | 15/105 |
| 4,471,985 | 9/1984 | Mahoney | 294/10 |
| 4,667,362 | 5/1987 | Mattingly | 15/236.08 |
| 4,668,302 | 5/1987 | Kolodziej et al. | 15/236 R |
| 4,769,939 | 9/1988 | Gonska et al. | 294/2 |
| 4,823,419 | 4/1989 | Stimpson | 7/167 |
| 5,065,977 | 11/1991 | Desjardin | 15/236.08 |
| 5,255,406 | 10/1993 | Rood | 15/236.06 |

*Primary Examiner*—James G. Smith
*Assistant Examiner*—Lee Wilson
*Attorney, Agent, or Firm*—Richard W. Carpenter; Robert J. Black

[57] ABSTRACT

A multi-purpose tool, for use with a barbecue grill, having a hook at one end thereof and a relatively thin curved and tapered blade at the other end thereof which tool can be used for many different functions such as lifting and repositioning a grill cover and/or grate, adjusting the position of an air vent, holding and positioning a charcoal briquet, cleaning the bars of the grill grate by scraping, and moving ashes toward an opening in the kettle portion of the grill.

11 Claims, 1 Drawing Sheet

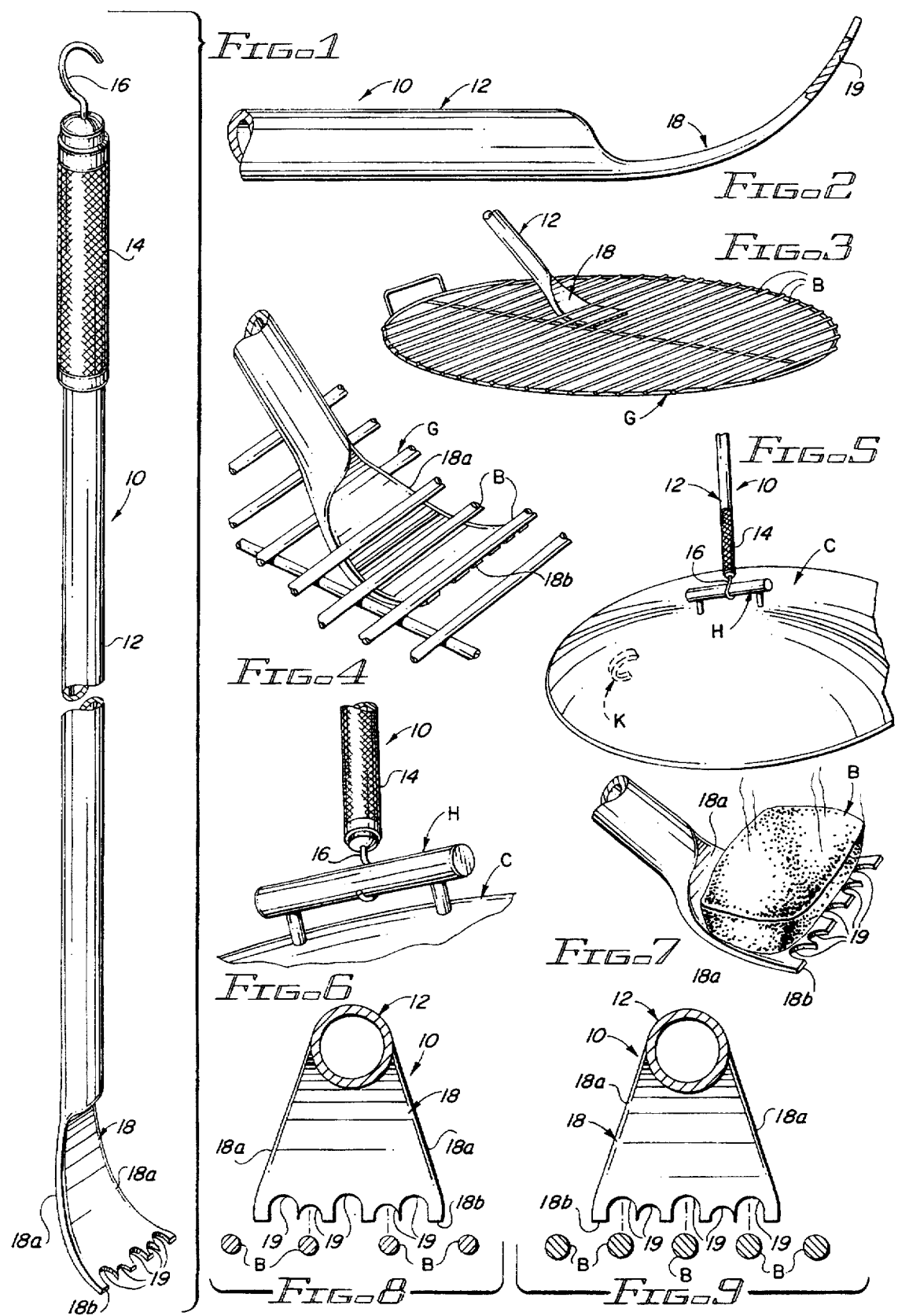

MULTI-PURPOSE TOOL FOR BARBECUE GRILL

BACKGROUND OF THE INVENTION

1. Field of the Invention

This invention relates to equipment for use with a barbecue grill, and more to a multi-purpose tool that can be used for many different functions such as lifting a grill cover or grate, adjusting the position of an air vent, holding and positioning a charcoal briquet, and moving ashes toward an opening in the grill.

2. Description of the Background Art

A background art search directed to the subject matter of this invention conducted in the United States Patent and Trademark Office disclosed the following United States Letters Patent:

U.S. Pat. Nos. Des. 199,019, 45,541, 89,103, 355,754, 832,541, 589,200, 831,110, 1,235,038, 1,402,975, 1,613, 729, 1,291,015, 2,747,911, 2,810,944, 2,824,323, 3,522,932, 3,820,185, 4,112,537, 4,214,342, 4,282,625, 4,471,985, 4,668,302, 4,801,166, 4,958,403, 5,255,406.

None of the patents uncovered in the search discloses a multi-purpose tool having a hook at one end thereof and a relatively thin curved and tapered blade at the other end thereof which tool can be used for many different functions such as lifting and repositioning a barbecue grill cover and/or grate, adjusting the position of an air vent, holding and positioning a charcoal briquet, and moving ashes toward an opening in the kettle portion of the grill.

SUMMARY OF THE INVENTION

It is a primary object of the invention to provide a multi-purpose tool that can be used for many different functions such as lifting a grill cover or grate, adjusting the position of an air vent, holding and positioning a charcoal briquet, and moving ashes toward an opening in the kettle of the grill.

Another object of the invention is the provision of a multi-piece tool with an elongated shaft having an enlarged, insulated handle section and a hook at one end thereof and a blade at the other end thereof.

A more specific object of the invention is to provide a tool of the type described wherein the blade is relatively thin, tapered, and curved for lifting a grate or a charcoal briquet, and has a serrated front edge for cleaning bars of a grill grate.

These and other objects of the invention will be apparent from an examination of the following description and drawings.

BRIEF DESCRIPTION OF THE DRAWINGS

FIG. 1 is a an isometric view of a multi-purpose tool embodying features of the present invention;

FIG. 2 is a side elevational view of a portion of the structure illustrated in FIG. 1;

FIG. 3 is an isometric view of the grate of a barbecue grill with a portion of the multi-purpose tool of the invention shown engaging bars of the grate;

FIG. 4 is an enlarged view of a portion of the structure illustrated in FIG. 3;

FIG. 5 is an isometric view showing how the tool of the invention is used to lift the cover of a barbecue grill;

FIG. 6 is an enlarged view of a portion of the structure illustrated in FIG. 5;

FIG. 7 is an isometric view showing how the tool of the invention is used to lift a charcoal briquet; and FIGS. 8 and 9 are cross sectional views of the structure illustrated in FIG. 1 showing the tool of the invention being positioned for use in cleaning barbecue grill grate bars of different sizes.

It will be understood that, for purposes of clarity, certain elements may have been omitted from certain views where they are believed to be illustrated to better advantage in other views.

DESCRIPTION OF THE PREFERRED EMBODIMENT

Referring now to the drawings for a better understanding of the invention, it will be seen the multi-purpose tool of the invention, indicated at 10 in FIG. 1 of the drawings includes an elongated, cylindrical, preferably hollow shaft 12, which has, adjacent one end thereof an enlarged handle section 14 which may be formed from a different material than the shaft, so as to be somewhat insulated. The handle portion outer surface may also be roughened by knurling or other means.

At the end of the shaft 10 adjacent the handle section 14, the shaft may be provided with an integral, axially outward projecting, generally C-shaped hook 16 which is adapted for use in engaging and lifting a barbecue grill cover C, as shown in FIGS. 5 and 6, so the cover can by hung on a grill kettle (not shown) by the hook on the underside of the cover, shown in FIG. 5.

As best seen in FIGS. 2 and 4, blade 18 of the tool 10 is relatively thin and curves from the lower side of the shaft to a location beyond the upper side of the shaft to form a scoop or shovel like receptacle for lifting a grate G by the bars B, as seen in FIGS. 3 and 4, or lifting a charcoal briquet, as seen in FIG. 7.

As best seen in FIGS. 8 and 9, the blade 18, as seen from above, is tapered and is generally triangular in shape with side edges 18a that diverge forwardly from the shaft 12 to opposite ends of a straight front edge 18b. In order to make it easier to use the tool to push ashes along the curved contour of the kettle of the grill, the side edges 18a of the blade 18 may be curved.

As best seen in FIGS. 8 and 9, the blade front edge 18b is provided with a plurality of laterally spaced curved openings or recesses 19 of varying sizes for use in scraping grill grate bars B of different diameters and/or different bar spacings.

Thus, it will be appreciated that the invention provides a multi-purpose tool that designed and constructed so as to be extremely valuable for performing several different functions with a barbecue grill.

What is claimed is:

1. A multi-purpose tool for use with a barbecue grill, comprising:
    (a) an elongated cylindrical shaft including an enlarged handle section adjacent one end thereof;
    (b) an integral generally C-shaped hook projecting axially outward from said shaft one end and being arranged and disposed to engage a handle of a barbecue grill cover to lift said cover;
    (c) an integral blade projecting axially outward from another end of said shaft;
    (d) said blade being curved, and being arranged and disposed to:
        (i) engage bars of a barbecue grill grate to lift said grate and reposition it within in said grill;

(ii) engage and adjust the position of an air vent of said barbecue grill between open and closed positions;

(iv) hold, carry, and reposition a charcoal briquet in said barbecue grill;

(v) move ashes in said grill toward an opening in said grill, to facilitate removal of said ashes;

(e) said blade including:
 (i) a straight front edge having a plurality of laterally spaced openings of different sizes therein arranged and disposed to receive cylindrical bars of a grate for scraping same clean;
 (ii) a pair of opposed side edges diverging forwardly from said shaft to opposite ends of said front edge.

2. A multi-purpose tool according to claim 1, wherein said blade curves from one side of said shaft to a location beyond another side of said shaft.

3. A multipurpose tool according to claim 1, wherein said shaft is hollow throughout substantially all of its length.

4. A multi-purpose tool according to claim 1, wherein said handle section has a diameter larger than the diameter of the remaining portion of said shaft.

5. A multi-purpose tool according to claim 1, wherein said blade laterally spaced openings are of varying sizes and spacing for use with grate bars of different sizes and spacings.

6. A multi-purpose tool for use with a barbecue grill, comprising:

(a) an elongated cylindrical shaft including an insulated handle section adjacent one end thereof;

(b) an integral hook projecting axially outward from said shaft one end and being arranged and disposed to engage a handle of a barbecue grill cover to lift said cover;

(c) an integral blade projecting axially outward from another end of said shaft;

(d) said blade being curved and being arranged and disposed to:
 (i) engage bars of a barbecue grill grate to lift said grate and reposition it within in said grill;
 (ii) engage and adjust the position of an air vent of said barbecue grill between open and closed positions;
 (iv) hold, carry, and reposition a charcoal briquet in said barbecue grill;
 (v) move ashes in said grill toward an opening in said grill, to facilitate removal of said ashes;

(e) said blade including:
 (i) a straight front edge having a plurality of laterally spaced openings therein arranged and disposed to receive cylindrical bars of a grate for scraping same clean;

said laterally spaced blade openings are of varying sizes and spacing for use with grate bars of different sizes and spacing;

(ii) a pair of opposed side edges diverging forwardly from said shaft to opposite ends of said front edge.

7. A multi-purpose tool according to claim 6, wherein said hook is generally C-shaped in contour.

8. A multi-purpose tool according to claim 6, wherein said blade is generally triangular and curved.

9. A multi-purpose tool according to claim 6, wherein said blade curves from one side of said shaft to a location beyond another side of said shaft.

10. A multipurpose tool according to claim 6, wherein said shaft is hollow throughout substantially all of its length.

11. A multi-purpose tool according to claim 6, wherein said handle section is made of less heat conductive material than the major portion of said shaft.

\* \* \* \* \*